United States Patent
Chang

(10) Patent No.: US 10,349,039 B2
(45) Date of Patent: Jul. 9, 2019

(54) OBJECT DETECTION SYSTEMS AND METHODS

(71) Applicant: Wistron Corp., New Taipei (TW)

(72) Inventor: Yao-Tsung Chang, New Taipei (TW)

(73) Assignee: WISTRON CORP., New Taipei (TW)

( * ) Notice: Subject to any disclaimer, the term of this patent is extended or adjusted under 35 U.S.C. 154(b) by 148 days.

(21) Appl. No.: 15/619,386

(22) Filed: Jun. 9, 2017

(65) Prior Publication Data

US 2018/0232892 A1 Aug. 16, 2018

(30) Foreign Application Priority Data

Feb. 10, 2017 (TW) .................................. 106104374

(51) Int. Cl.
| | | |
|---|---|---|
| *G06K 9/32* | (2006.01) | |
| *H04N 13/254* | (2018.01) | |
| *G06T 7/521* | (2017.01) | |
| *G06T 7/246* | (2017.01) | |
| *G06K 9/20* | (2006.01) | |

(52) U.S. Cl.
CPC ......... *H04N 13/254* (2018.05); *G06K 9/2036* (2013.01); *G06K 9/3241* (2013.01); *G06T 7/246* (2017.01); *G06T 7/521* (2017.01); *G06T 2207/10016* (2013.01); *G06T 2207/10152* (2013.01)

(58) Field of Classification Search
CPC . G06T 2207/10028; G06T 2207/10152; G06T 2207/30252; G06T 7/285; G06T 7/292; G06T 7/521; H04N 13/254
See application file for complete search history.

(56) References Cited

U.S. PATENT DOCUMENTS

| | | | | |
|---|---|---|---|---|
| 2004/0263510 A1* | 12/2004 | Marschner | .............. | G06T 13/40 345/419 |
| 2010/0321558 A1* | 12/2010 | Chiu | ....................... | G01S 11/12 348/360 |
| 2014/0267701 A1* | 9/2014 | Aviv | .................... | G01C 11/025 348/136 |
| 2015/0124238 A1* | 5/2015 | Sakai | .................... | G01S 17/026 356/4.01 |

FOREIGN PATENT DOCUMENTS

| | | |
|---|---|---|
| CN | 101930071 A | 12/2010 |
| TW | I495842 B | 8/2015 |

\* cited by examiner

*Primary Examiner* — Siamak Harandi

(57) ABSTRACT

The present invention provides an object detecting system, adapted to a motion-control device, including at least one projecting unit, at least one image sensing unit and a processor. The projecting unit projects a plurality of sets of structured light corresponding to a first scanning resolution with a first scanning frequency toward a first direction. The image sensing unit senses the reflected structured light. The processor obtains a plurality of three-dimensional images corresponding to the first direction according to the sensed structured light, and determines whether there is at least one object that will move into a safe region of the motion-control device according to the three-dimensional images. When the processor detects the object, the processor adjusts the first scanning frequency and/or a scanning region of the projecting unit or the first scanning resolution.

18 Claims, 8 Drawing Sheets

OBJECT DETECTION SYSTEMS AND METHODS

CROSS REFERENCE TO RELATED APPLICATIONS

This Application claims priority of Taiwan Patent Application No. 106104374, filed on Feb. 10, 2017, the entirety of which is incorporated by reference herein.

BACKGROUND

Field

The application relates in general to an object detection system and method, and more particularly to an object detection system and method of adjusting a scanning frequency and/or a scanning region of the projecting unit or scanning resolution when the object is detected to be moving into a safe region of a motion-control device.

Description of the Related Art

In recent years, applications using 3D cameras have gradually become popular. In addition to providing high-quality three-dimensional images, they can also measure the distance between objects by measuring the time that it takes for light to be projected to and reflected back from the objects. However, when the technology is used to detect a region with a wide range, it may take more time and use up more computing resources. Moreover, when a 3D camera is focused on a moving object, it puts a great load on the processor to rapidly detect three-dimensional information. Therefore, how to use limited resources to obtain image information for moving objects and to determine whether there is an object that is moving toward the device is a problem that needs to be solved.

BRIEF SUMMARY

An embodiment of the present disclosure provides an object detection system, adapted to a motion-control device, which includes at least one projecting unit, an image sensing unit, and a processor. The projecting unit projects a plurality of sets of structured light corresponding to a first scanning resolution with a first scanning frequency toward a first direction. The image sensing unit senses reflected structured light. The processor obtains a plurality of three-dimensional images corresponding to the first direction according to the sensed structured light, and determines whether there is at least one object that may move into a safe region of the motion-control device according to the three-dimensional images. When the processor detects the object, the processor further obtains a first target region corresponding to the object and outputs a first control signal to the projecting unit to adjust the first scanning frequency and/or a scanning region of the projecting unit or the first scanning resolution.

Another embodiment of the present disclosure provides an object detection method, adapted to a motion-control device The method includes using at least one projecting unit to project a plurality of sets of structured light corresponding to a first scanning resolution with a first scanning frequency toward at least one projecting unit in a first direction; using at least one image sensing unit to sense the reflected structured light; using a positioning unit to detect the direction of motion and a moving speed of the motion-control device; using a processor to obtain a plurality of three-dimensional images corresponding to the first direction according to the sensed structured light through a processor; and using the processor to determine whether there is at least one object that may move into a safe region of the motion-control device according to the direction of motion, the moving speed and the three-dimensional images. When the object is detected, the processor further obtains a first target region that corresponds to the object and outputs a first control signal to the projecting unit to adjust the first scanning frequency and/or a scanning region of the projecting unit or the first scanning resolution.

BRIEF DESCRIPTION OF DRAWINGS

The disclosure can be more fully understood by reading the subsequent detailed description and examples with references made to the accompanying drawings, wherein.

DETAILED DESCRIPTION

Further areas in which the present systems and methods can be applied will become apparent from the detailed description provided herein. It should be understood that the detailed description and specific examples, while indicating exemplary embodiments of the object detection method and system, are intended for the purposes of illustration only and are not intended to limit the scope of the disclosure.

Figure 1:
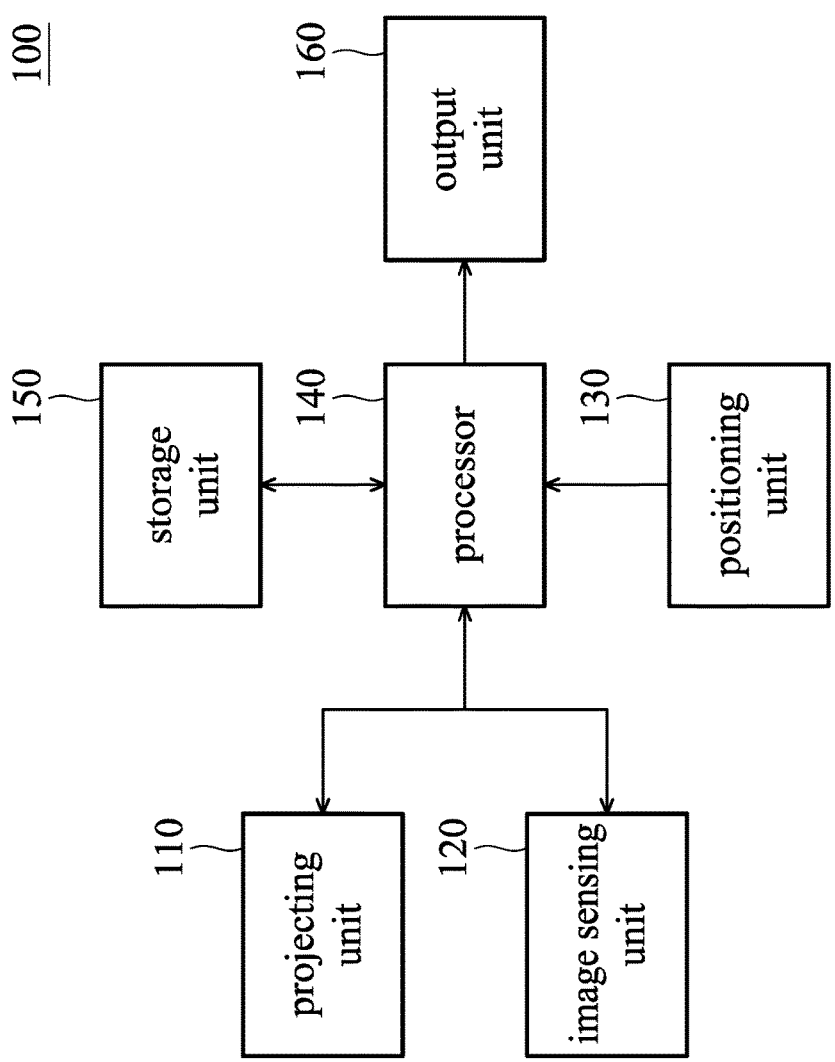
FIG. 1 illustrates a schematic view of an object detection system in accordance with an embodiment of the present invention.

FIG. 1 illustrates a schematic view of an object detection system in accordance with an embodiment of the present invention. The object detection system 100 can be provided on a motion-control device (e.g., an autonomous car or an unmanned flying vehicle, etc.), including at least one projecting unit 110, at least one image sensing unit 120, a positioning unit 130, a processor 140, a storage unit 150 and an output unit 160. The projecting unit 110 is a circuit capable of emitting a non-visible light (e.g., a laser or infrared ray, etc.) for projecting structured light having different patterns to a predetermined range. The image sensing unit 120 corresponds to the projecting unit 110. It can be a camera capable of sensing the non-visible light, such as an infrared camera or the like, for capturing the optical information of the reflected structured light (e.g., angles of reflected light, etc.) to determine the distance between the object and the motion-control device. Since the projecting range of the existing projecting unit 110 is limited, the motion-control device generally has a plurality of sets of projecting units 110 and the corresponding image sensing units 120 in order to obtain all information about the surroundings of the motion-control device. For example, when the projecting range of the projecting unit 110 is 120°, the motion-control device may have three sets of projecting units 110 and the corresponding image sensing units 120 to obtain all information about the surroundings of the motion-control device. In addition, according to another embodiment of the present invention, a set consisting of the projecting unit 110 and the corresponding image sensing unit 120 can be provided on a rotating structure, so that the projecting unit 110 and the corresponding image sensing unit 120 are capable of rotating on the rotating structure to project the structured light in all directions and sense the reflected structured light.

The positioning unit 130 can be a global positioning system (GPS) or a gyroscope or the like for detecting information pertaining to the direction of motion and moving speed of the motion-control device. The processor 140 can be a central processing unit (CPU) or a graphics processing unit (GPU) or the like for acquiring image information of the surroundings corresponding to the projecting direction based on the received reflected structured light, and determine whether there is an object that may move into the safe region according to the image information of the surroundings and/or the direction of motion and the moving speed of the motion-control device detected by the position unit 130. The safe region is defined according to the moving speed and the direction of motion of the motion-control device 100. The storage unit 150 can be a memory for storing the information described above and an application program for executing the above operations. The output unit 160 can be a display for displaying the three-dimensional image obtained by the processor 140 and the operation results described above.

Figure 2:
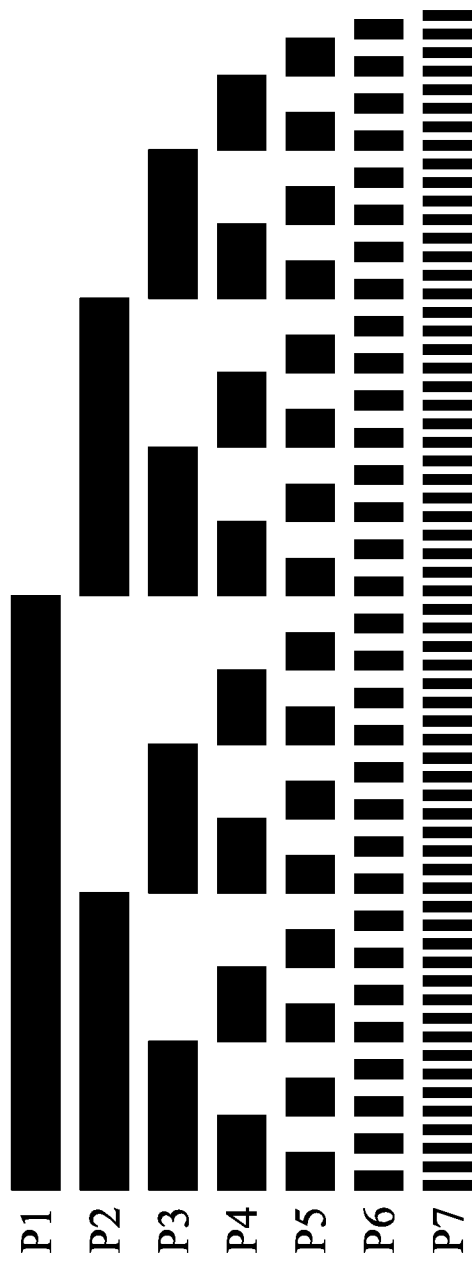
FIG. 2 illustrates a schematic diagram of a coding of a structured light in accordance with an embodiment of the present invention.

The coding of the structured light can be basically divided into three types: Time-multiplexing, Spatial Neighborhood and Direct Coding. In one embodiment of the present invention, the structured light projected by the projecting unit 110 is coded by the Time-multiplexing with Binary coded; that is, different light patterns composed of "1" and "0" are projected to the object to detect the position of the object according to the reflected light. FIG. 2 illustrates a schematic diagram of the coding of a structured light in accordance with an embodiment of the present invention. As shown in FIG. 2, the light patterns P1 to P7 respectively have different numbers of coding lines. For example, the light pattern P1 cuts the scanning region into "$2^1$" sub-regions, and the light is projected on the left sub-region; that is, the light pattern P1 has "$2^1/2=1$" coding line. The light pattern P2 cuts the scanning region into "$2^2$" sub-regions, and the light is projected on the first and third sub-regions from the left-hand side, i.e., the light pattern P2 has "$2^2/2=2$" coding lines. The light pattern P3 cuts the scanning region into "$2^3$" sub-regions, and the light is projected on the first, third, fifth, and seventh sub-regions from the left-hand side, i.e., the light pattern P3 has "$2^3/2=4$" coding lines, and so on. In other words, when the projecting unit 110 projects a set of structured light composed of the light patterns P1, P2, and P3 to the scanning region, the scanning resolution corresponding to the scanning region is "$2^3-1$". In the embodiment described above, since all the light of the light patterns will not project to the rightmost sub-region, the scanning resolution of the scanning region is "$2^3-1$" instead of "$2^3$". When the scanning resolution corresponding to the structured light becomes higher, this means that the resolution of the three-dimensional image becomes finer. In one embodiment of the present invention, when the object detection system 100 is in a general detection mode, the scanning resolution is 511; that is, the projecting unit 110 projects a set of structured light having the light patterns of $2^1$ to $2^9$ sub-regions to the scanning region. However, when the processor 140 determines that no object has been detected for a predetermined time period, the scanning resolution can be reduced to 255; that is, the projecting unit 110 projects a set of structured light having the light patterns of $2^1$ to $2^8$ sub-regions to the scanning region. On the other hand, when the processor 140 determines that an object that may be moving into the safe region of the motion-control device, the scanning resolution can be increased to 1023; that is, the projecting unit 110 projects a set of structured light having the light patterns of $2^1$ to $2^{10}$ sub-regions to the scanning region. It should be noted that, when the projecting unit 110 projects a set of structured light, the projection order of the light pattern can be random.

Figure 3:
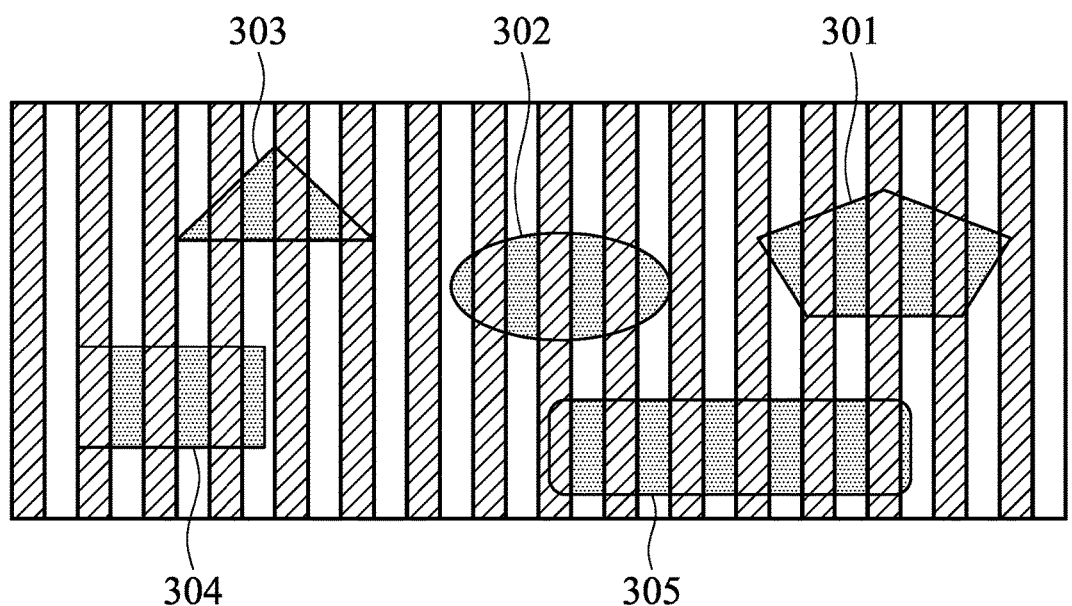
FIG. 3 illustrates a schematic diagram of the surrounding information of the motion-control device in accordance with an embodiment of the present invention.

FIG. 3 illustrates a schematic diagram of the surrounding information of the motion-control device in accordance with an embodiment of the present invention. As shown in FIG. 3, the objects 301 to 305 are detected around the motion-control device after the processor 140 performs one scan with the scanning resolution of "511" in the general detection mode. In this embodiment, after multiple scans are performed, the processor 140 determines that the object 301 has moved into the safe region of the motion-control device 100 based on the image information of the surrounding environment and/or the moving speed and the direction of motion of the motion-control device. After that, the processor 140 outputs a control signal to adjust the scanning frequency and/or the scanning region of the projecting unit 110 or the resolution of the structured light, or the processor 140 selectively only processes a portion of the three-dimensional image. In this embodiment, the processor 140 may determine whether the object will move into the safe region of the motion-control device 100 based on the coordinates of the object corresponding to the motion-control device 100 and a sampling time of at least two images of the surrounding environment.

In addition, according to another embodiment, when the processor 140 determines that the object will move into the safe region, the processor 140 may further decide whether to track the object or not based on the distance between the object and the motion-control device 100. For example, when the processor 140 determines that the object will move into the safe region after $T_1$ seconds which is less than a predetermined reaction time $T_R$ of the motion-control device 100, the processor 140 tracks the object continuously. Conversely, when $T_1$ seconds is greater than the predetermined reaction time $T_R$ of the motion-control device 100, the processor 140 may track the object after $(T_1-T_R)$ seconds to reduce the power consumption of the motion-control device 100.

Figure 4:
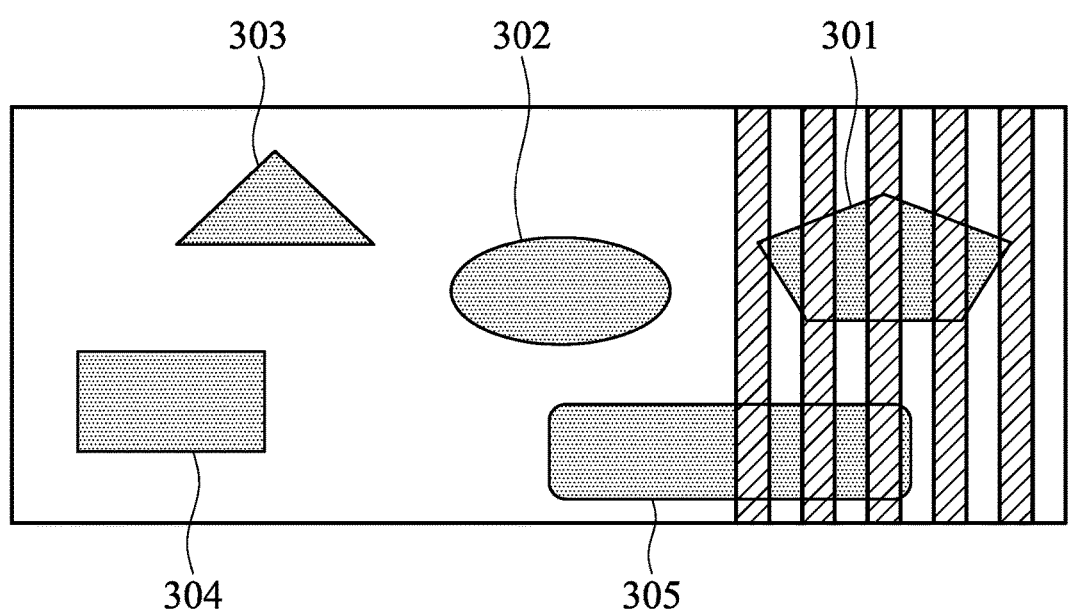
FIGS. 4-9 illustrate schematic diagrams of the surrounding information of the motion-control device in which one or more of a scanning frequency of the projecting unit, a scanning region of the projecting unit and a scanning resolution are adjusted in accordance with embodiments of the present invention.
Figure 5:
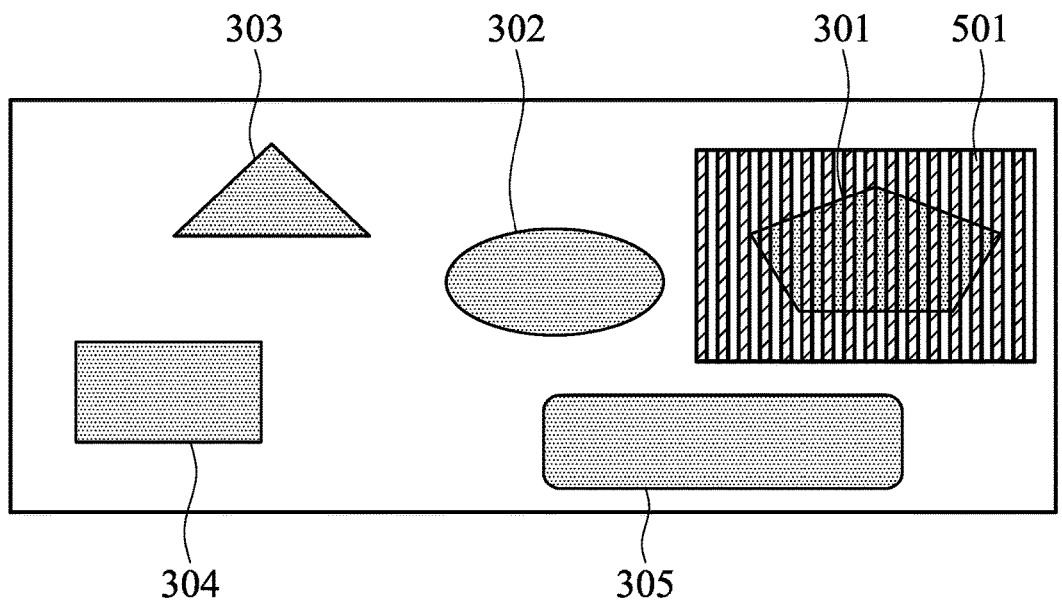

As shown in FIG. 4, after the processor 140 detects the moving object 301, the processor 140 reduces the horizontal scanning range without changing the scanning resolution and the scanning frequency; that is, the processor 140 only scans the region having the object 301. Alternatively, according to another embodiment of the present invention, as shown in FIG. 5, the processor 140 further reduces the scanning region of the structured light of the projecting unit 110 and increases the scanning resolution (e.g., the scanning resolution is increased from "511" to "1023") to obtain a better three-dimensional image of the object 301.

Figure 6:
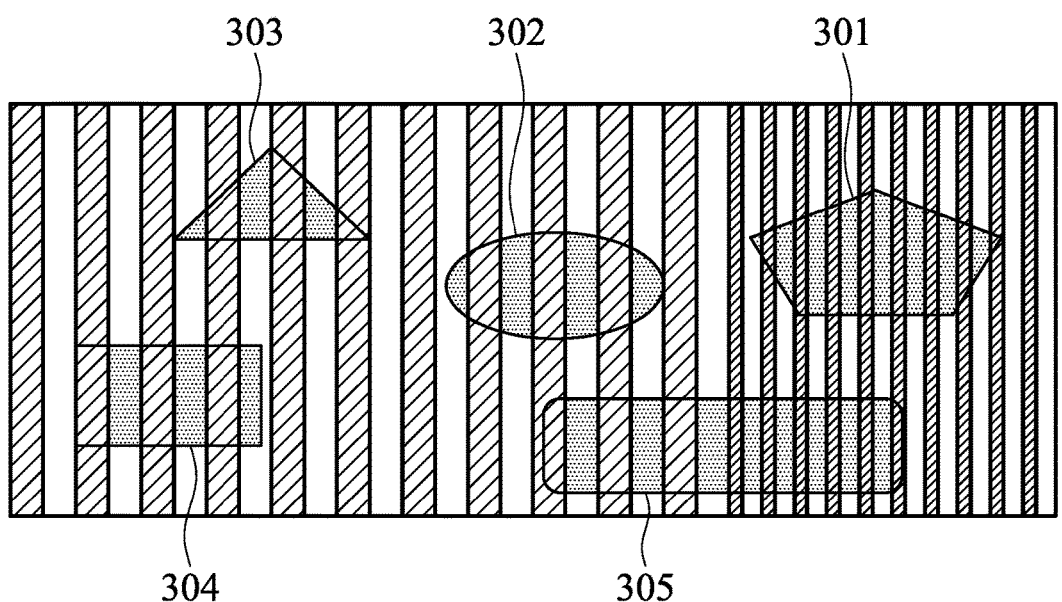

FIG. 6 illustrates a schematic diagram of scanning different regions with different scanning resolutions in accordance with another embodiment of the present invention. As shown in FIG. 6, after the processor 140 detects that the object 301 may move into the safe region of the motion-control device 100, the processor 140 increases the scanning resolution of the structured light projected to the region having the object 301, but keeps the scanning resolution of the structured light projected to other regions. For example, the scan resolution corresponding to the area having the object 301 is increased from "511" to "1023" while the scan resolution of the other area stays at "511" to continuously monitor whether there are other objects moving into the safe region.

Figure 7A:
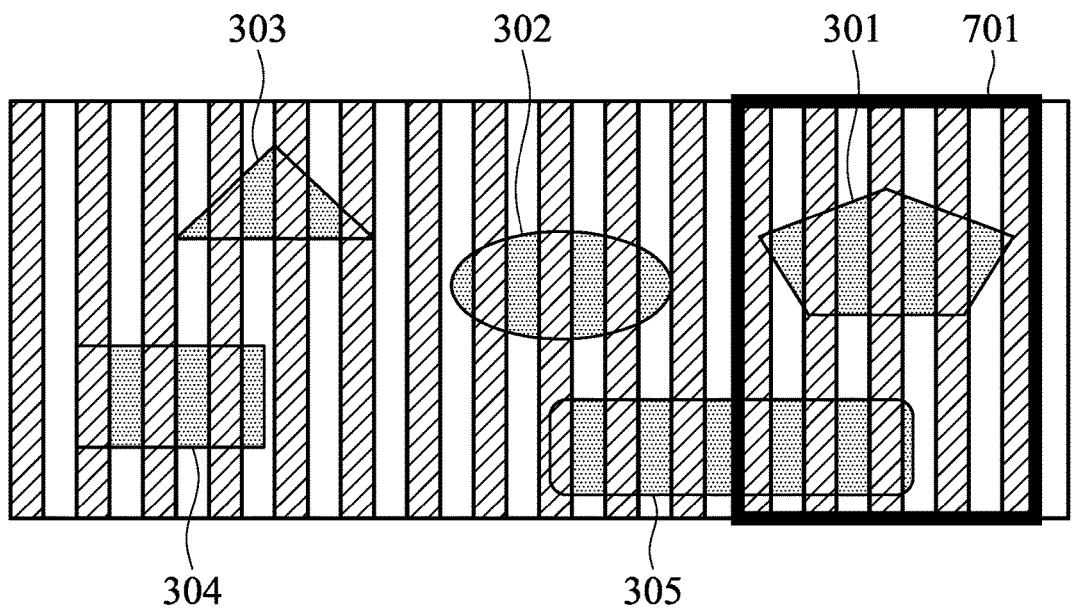
Figure 7B:
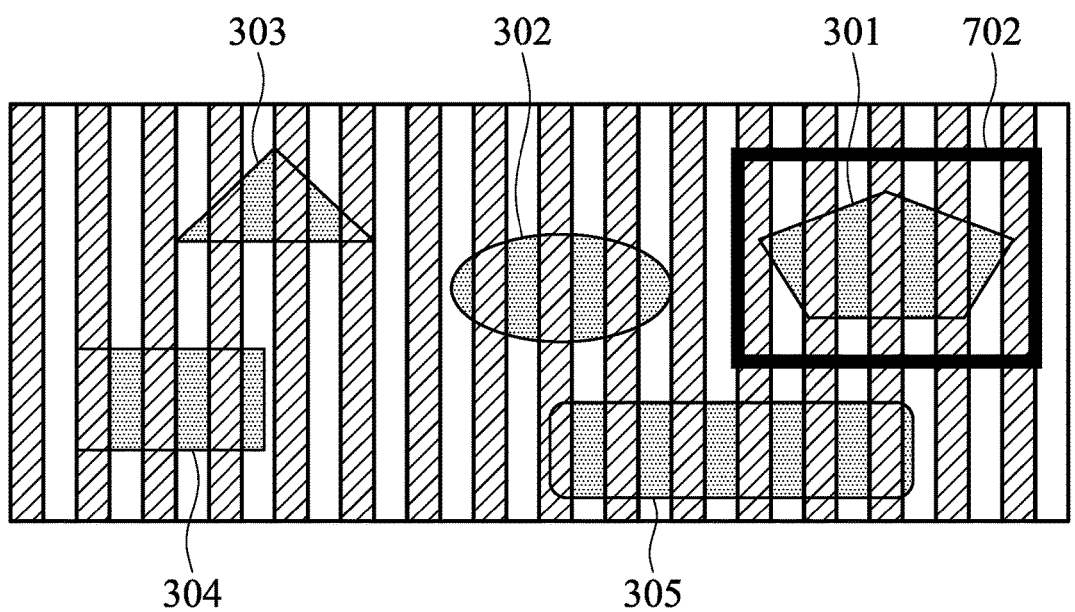

According to another embodiment of the present invention, as shown in FIGS. 7A and 7B, after the processor 140 detects the object 301 which may move into the safe region, the projecting unit 110 continues to project the structured light to the surroundings of the motion-control device with the same scanning resolution. However, when the processor 140 receives the reflected structured light through the image sensing unit 120, the processor only processes the data of the region having the object 301 (the area 701, 702 shown in FIG. 7B), and the data of the other regions is ignored in order to reduce the load on the processor 140 and increase the processing speed.

Figure 8A:
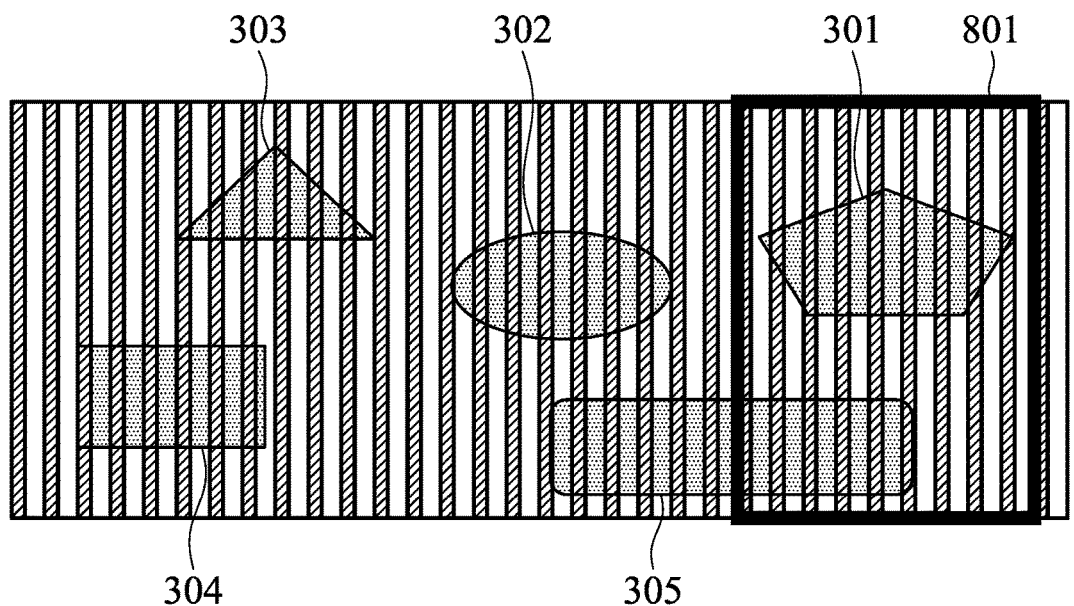
Figure 8B:
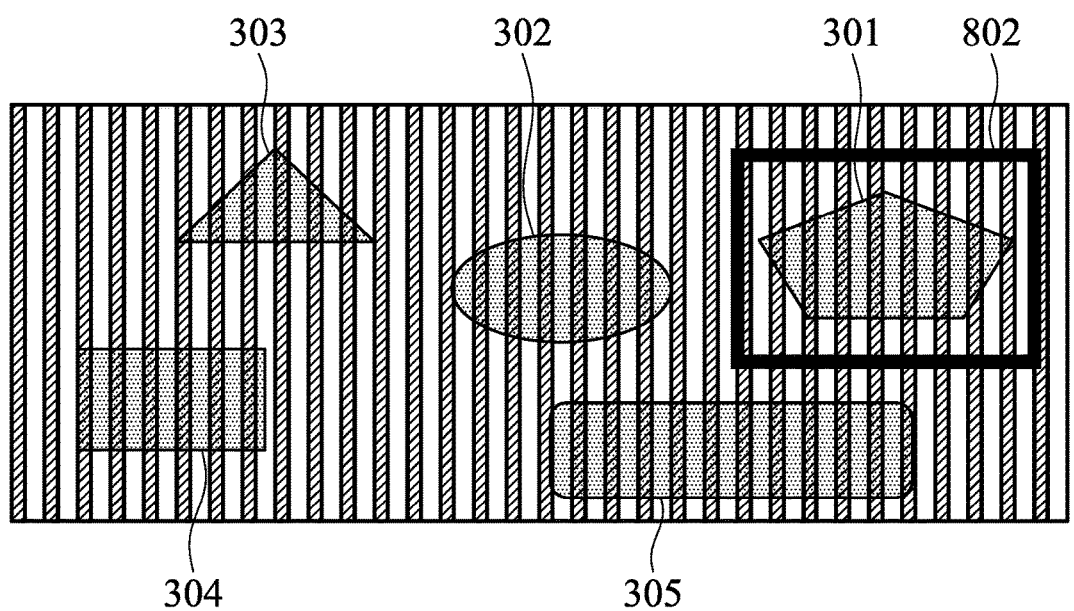

In addition, after the processor 140 detects that the object 301 may move into the safe region, the processor 140 may also selectively control the projecting unit 110 to increase the scanning resolution (e.g., the scanning resolution is increased from "511" to "1023"), only processing the data of the region having the object 301 (the area 801, 802 shown in FIGS. 8A, 8B), and ignoring the data of the other region.

Figure 9:
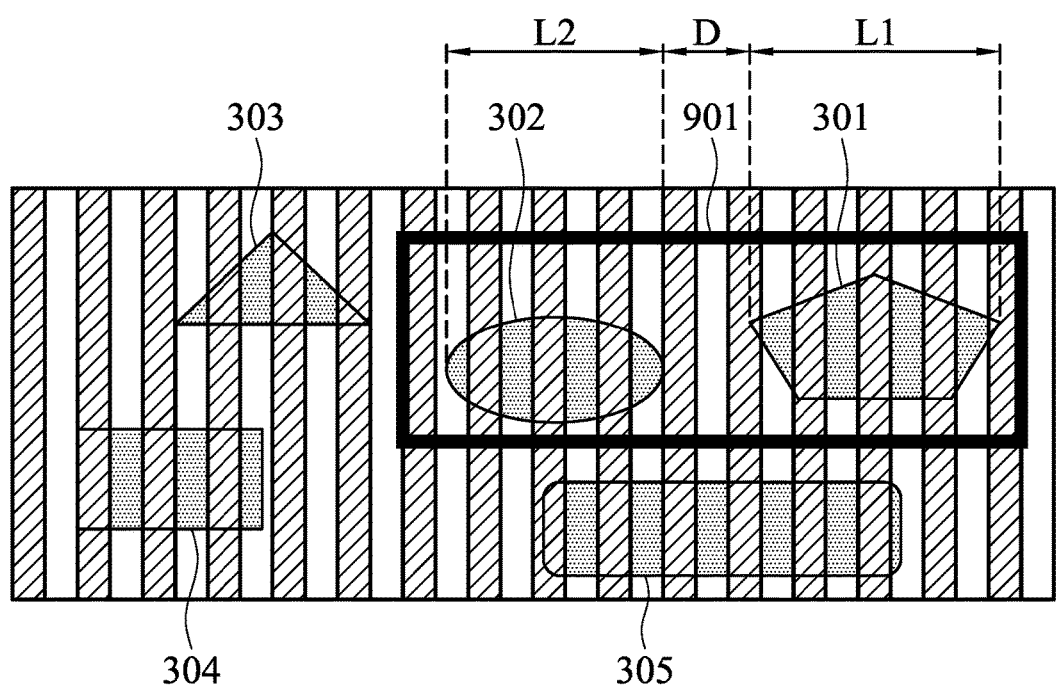

According to another embodiment of the present invention, when the processor 140 detects that there are two or more objects moving into the safe region of the motion-control device simultaneously, the processor 140 first determines the distance between the two objects according to the obtained three-dimensional images. If the distance is less than a predetermined value, the regions corresponding to the two objects are combined into a larger region for performing the processes described above. For example, as shown in FIG. 9, the processor 140 detects that the objects 301 and 302 are coming toward the safe region of the motion-control device, and when the distance D between object 301 and object 302 is less than the width L1 of object 301 (or the width L2 of object 302), the processor 140 combines the regions that correspond to the objects 301 and 302 into a region 901 to process and monitor objects 301 and 302 simultaneously. Otherwise, when the distance D between object 301 and object 302 is greater than or equal to the width L1 of object 301 (or the width L2 of object 302), the processor 140 processes the regions that correspond to objects 301 and 302 separately.

Figure 10:
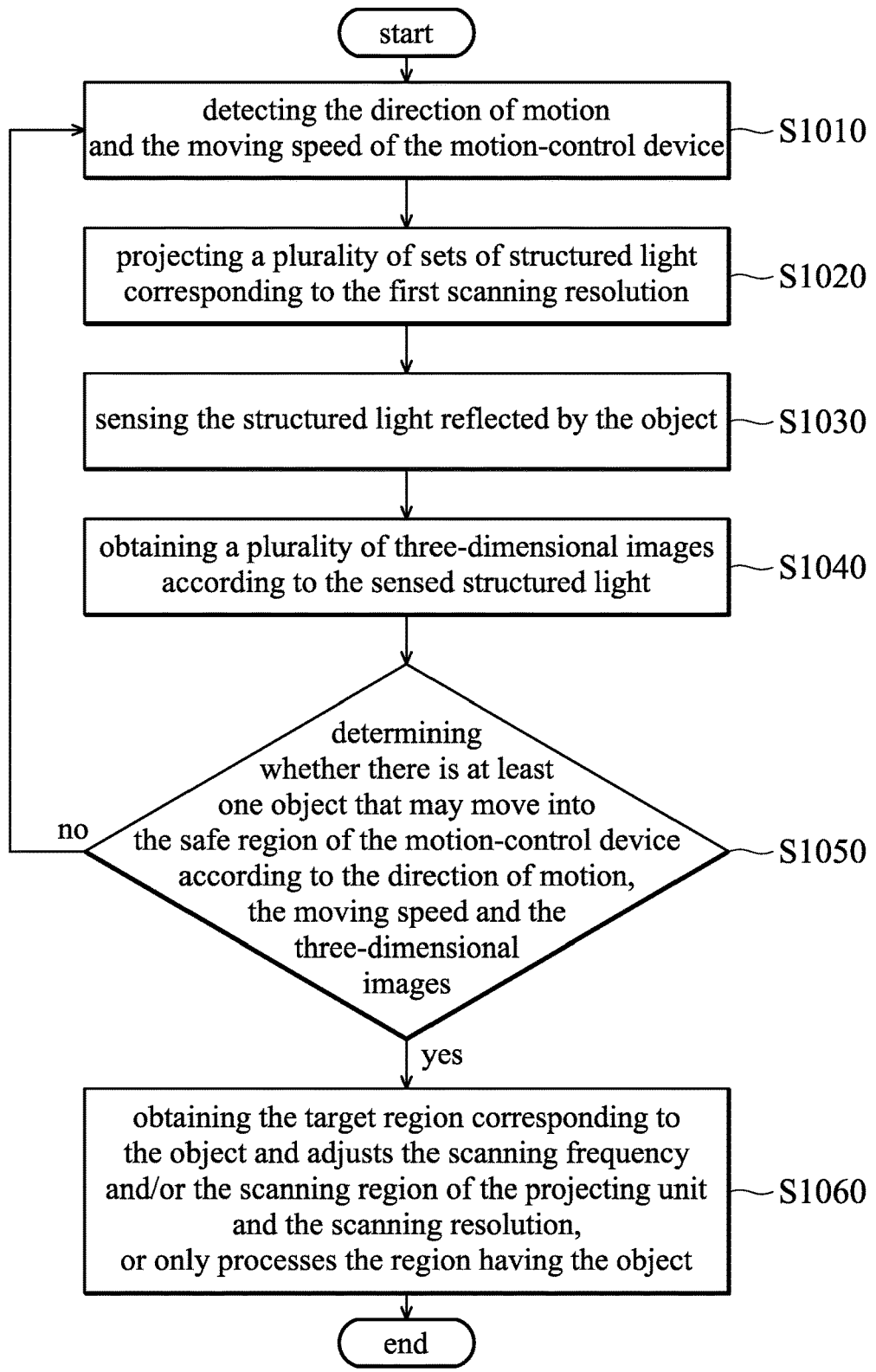
FIG. 10 illustrates a flowchart of an object detection method in accordance with an embodiment of the present invention.

FIG. 10 illustrates a flowchart of an object detection method in accordance with an embodiment of the present invention. In step S1010, the positioning unit 130 detects the direction of motion and the moving speed of the motion-control device 100. In step S1020, the projecting unit 110 projects a plurality of sets of structured light corresponding to the first scanning resolution. In step S1030, the image sensing unit 120 senses the structured light reflected by the object. In step S1040, the processor 140 obtains a plurality of three-dimensional images according to the sensed structured light. In step S1050, the processor 140 determines whether there is at least one object that may move into the safe region of the motion-control device 100 according to the direction of motion, the moving speed and the three-dimensional images. When the processor 140 detects an object that may move into the safe region, the method proceeds to step S1060, the processor 140 obtains the target region corresponding to the object and adjusts the scanning frequency and/or the scanning region of the projecting unit and the scanning resolution, or only processes the region having the object. Conversely, when the processor 140 does not detect any object that may move into the safe region, the method returns to step S1010, the positioning unit 130 and the projecting unit 110 repeat the processes described above.

As described above, according to the object detection system and method of the present invention, after the processor detects an object that may move into the safe region of the motion-control device, the information of the moving object can be obtained by increasing the scanning frequency and/or the scanning region of the projecting unit and the scanning resolution, and the load on the processor can be reduced by not scanning the other regions or by ignoring the information of the other regions. In addition, if no object is detected for a predetermined period of time, the processor may reduce the scanning frequency of the projecting unit or the scanning resolution to reduce the power consumption of the motion-control device.

It will be apparent to those skilled in the art that various modifications and variations can be made to the structure disclosed without departing from the scope or spirit of the disclosure. In view of the foregoing, it is intended that the present disclosure covers modifications and variations of this disclosure, provided they fall within the scope of the following claims and their equivalents.

What is claimed is:

1. An object detection system, adapted to a motion-control device, comprising:
   at least one projecting circuit, projecting a plurality of sets of structured light corresponding to a first scanning resolution with a first scanning frequency toward a first direction;
   a camera, sensing reflected structured light;
   a processor, coupled to the projecting circuit and the camera, obtaining a plurality of three-dimensional images corresponding to the first direction according to the sensed structured light, and determining whether there is at least one object that will move into a safe region of the motion-control device according to the three-dimensional images;
   wherein when the processor detects the object, the processor further obtains a first target region corresponding to the object and outputs a first control signal to the projecting circuit to adjust the first scanning frequency and/or a scanning region of the projecting circuit and the first scanning resolution,
   wherein the projecting circuit further projects the structured light corresponding to a second scanning resolution which is greater than the first scanning resolution toward the first target region according to the first control signal.

2. The object detection system as claimed in claim 1, wherein the projecting circuit further projects the structured light corresponding to the second scanning resolution only toward the first target region according to the first control signal.

3. The object detection system as claimed in claim 1, wherein the projecting circuit further projects the structured light corresponding to the first scanning resolution toward a region other than the first target region.

4. The object detection system as claimed in claim 1, wherein the processor only processes the sensed structured light corresponding to the first target region after the object is detected by the processor to obtain the three-dimensional images corresponding to the object.

5. The object detection system as claimed in claim 1, wherein the processor only processes the sensed structured light corresponding to the first target region to obtain the three-dimensional images corresponding to the object.

6. The object detection system as claimed in claim 1, wherein when the processor detects a plurality of objects, the processor further obtains a second target region corresponding to the plurality of objects.

7. The object detection system as claimed in claim 1, wherein the structured light is a non-visible light.

8. The object detection system as claimed in claim 1, wherein the structured light is formed by a Time-multiplexing method.

9. The object detection system as claimed in claim 1, further comprising:
    a rotating structure, provided with the projecting circuit and the camera, adapted to rotate the projecting circuit and the camera to face different directions according to a second control signal.

10. An object detection method, adapted to a motion-control device, comprising:
    projecting, using at least one projecting circuit, a plurality of sets of structured light corresponding to a first scanning resolution with a first scanning frequency toward at least one projecting circuit in a first direction;
    sensing, using at least one camera, the reflected structured light;
    detecting, using a positioning circuit, a direction of motion and a moving speed of the motion-control device;
    obtaining, using a processor, a plurality of three-dimensional images corresponding to the first direction according to the sensed structured light through a processor; and
    determining, using the processor, whether there is at least one object that will move into a safe region of the motion-control device according to the direction of motion, the moving speed and the three-dimensional images;
    wherein when the object is detected, the processor further obtains a first target region corresponding to the object and outputs a first control signal to the projecting circuit to adjust the first scanning frequency and/or a scanning region of the projecting circuit and the first scanning resolution, and the projecting circuit projects the structured light corresponding to a second scanning resolution which is greater than the first scanning resolution toward the first target region according to the first control signal.

11. The object detection method as claimed in claim 10, further comprising:
    projecting, using the projecting circuit, the structured light corresponding to the second scanning resolution only toward the first target region according to the first control signal.

12. The object detection method as claimed in claim 10, further comprising:
    projecting, using the projecting circuit, the structured light corresponding to the first scanning resolution toward a region other than the first target region.

13. The object detection method as claimed in claim 10, further comprising:
    processing, using the processor, only the sensed structured light corresponding to the first target region after the object is detected by the processor to obtain the three-dimensional images corresponding to the object.

14. The object detection method as claimed in claim 10, further comprising:
    processing, using the processor, only the sensed structured light corresponding to the first target region to obtain the three-dimensional images corresponding to the object.

15. The object detection method as claimed in claim 10, further comprising:
    obtaining, using the processor, a second target region corresponding to the plurality of objects when the processor detects a plurality of objects.

16. The object detection method as claimed in claim 10, wherein the structured light is a non-visible light.

17. The object detection method as claimed in claim 10, wherein the structured light is formed by a Time-multiplexing method.

18. The object detection method as claimed in claim 10, wherein the motion-control device further comprises a rotating structure, provided with the projecting circuit and the camera, adapted to rotate the projecting unit and the camera to face different directions according to a second control signal.

* * * * *